July 2, 1963     H. S. RUDZKI     3,096,248

METHOD OF MAKING AN ENCAPSULATED TABLET

Filed April 6, 1959

INVENTOR

HENRYK S. RUDZKI

BY William T. Wise

ATTORNEY

United States Patent Office 3,096,248
Patented July 2, 1963

3,096,248
METHOD OF MAKING AN ENCAPSULATED TABLET
Henryk S. Rudzki, West Los Angeles, Calif., assignor to Rexall Drug & Chemical Company, Los Angeles, Calif., a corporation of Delaware
Filed Apr. 6, 1959, Ser. No. 804,489
1 Claim. (Cl. 167—82)

This invention relates to tablets and particularly to compressed tablets having a coating of protective material and to the methods of making same. The invention in its broadest sense embraces such tablets applicable in any field in which their advantageous characteristics can be beneficially employed; for example human or veterinary medicine, human or animal food products.

However, their main application at present is in the provision of pharmaceutical tablets coated with a moisture and odor-resistant layer, this layer being soluble or partly soluble in body fluids and capable, if desired, of acting as a means of delaying or prolonging the therapeutic action of the therapeutically active ingredient.

In the past pharmaceutical tablets have been mostly sugar-coated. This process is a long and tedious one, requiring considerable skill and experience on the part of the operator to achieve a satisfactory product. Even with experienced operators the process requires about three days for completion, varying somewhat according to the size, shape and nature of the tablet and of the coating, color and composition.

The purpose of tablet coatings is several fold. Coatings are used to provide an elegant appearance to the tablet, to protect the tablet ingredients from deterioration and destruction by moisture, light, air, etc., to delay or prolong the dissolution of the active ingredients of the tablet in the body fluids.

Sugar-coatings possess various disadvantages. They are hard, brittle and are easily scratched. They do not provide effective protection against moisture, air, etc., and are too soluble to provide an effective delayed or prolonged-action tablet.

Prior tablet-coating processes have depended upon the use of the process known as pan-coating. This process comprises placing tablet cores containing the active ingredients in a revolving pan and applying a coating solution to the tumbling tablets in small amounts and then drying them with the aid of warm air or direct heat. Only after one application of the coating solution has been totally dried can another portion of solution be applied; and these steps have to be repeated a sufficient number of times to build the tablet to the required size, shape and color. This accounts for the time-consuming nature of the process.

It is also known to use in place of sugar and/or sugar-solutions, other materials such as plastics or resinous substances, for instance: hydroxyethyl cellulose, ethyl cellulose, carboxymethyl cellulose, polyvinylpyrollidone, etc. By reason of the fact that such materials are applied in solutions in alcohols or other organic solvents which are of higher volatility than water, a shortening of the coating time is achieved. To protect the ingredients of the tablet core from moisture, resinous materials such as shellac, zein, cellulose acetate-phthalate, etc., have been applied prior to applying the sugar-coating by pan-coating. However, unless the resinous-coating is applied in thick layers, it still permits the ingress of moisture, especially when using the pan-coating procedure as it is difficult thereby to produce a uniform and continuous film on the tablet core; "pin-holes" are quite often present, allowing the moisture from the sugar solutions to penetrate into the tablet core. This moisture penetration has a most damaging effect on the stability of the ingredients in the tablet core in many instances, for example: in a tablet containing such vitamins as $B_1$, $B_{12}$, C and others, and particularly if the tablet core is a multivitamin product. The moisture may trigger chemical reactions between the different components, resulting in a substantial loss of potency. Other common drugs which are sensitive to moisture are aspirin, ferrous sulfate, iodoform, etc.

It has also been found that when plastic materials are applied in solution by pan-coating, the coating upon evaporation of the solvent becomes tacky, causing the tablet cores to stick to each other. To overcome this a "duster" has been used, for example: talc, magnesium carbonate, calcium carbonate, etc. This procedure suffers from the disadvantage that the solid particles of the "duster" cause the film deposited to be discontinuous, tending to permit the ingress of moisture at these particles.

In addition to the difficulties in controlling the pan-coating procedure to achieve a good appearance of the tablet, a continuous even film, even distribution of color, etc., the use of organic solvents has the disadvantage of requiring special additional equipment to exhaust and recover the vapors. The use of such solvents also involves hazards such as danger of explosion, toxicity of vapors, and costliness. Also, it is possible for toxic traces to be left in the film coating of the tablet. Such traces of solvent trapped in the film coating may also evaporate subsequently leaving pinholes in the film, enabling moisture or other deleterious factors to affect the tablet core.

Another drawback to the pan-coating procedure resides in the fact that only about 100,000 tablets can be coated in one pan so that a battery of such pans is required to achieve a useful production output. In the case of sugar-coating, a substantial amount of dust is produced by the tumbling of the tablets in the rotating pans, requiring an adequate air exhaust system. Cold and warm air inputs are necessary and the shape of the coating pan makes it difficult to remove the moisture or solvent from its contents.

"Carbowax 6000," a polyethylene glycol polymer, has been used to replace sugar for tablet coatings in the pan-coating procedure to provide a protective, delayed or prolonged action coating, but has been found to require a gradual build-up on the tablet of a dozen or more coatings, and the finished tablet coating has been found to be too brittle and consequently tends to detach from the tablet.

It is an object of the present invention to provide tablets whereby the active ingredients are protected from the ingress of air and moisture by a continuous protective coating.

It is another object of this invention to provide a medicinal tablet coated with a plastic material which is soluble in body fluids whereby the medicament is released after a time delay and/or for a prolonged period.

Another object of this invention is to provide an improved method of making coated tablets.

Another object of this invention is to provide a method of making coated tablets which are of improved appearance, texture and taste, having improved resistance to external factors such as moisture and air, and having a controlled medicament release pattern when exposed to the body fluids.

Further objects and features of advantage will be recognized by one skilled in the art from the following detailed description.

The concept of this invention resides in a compressed tablet comprising a core hermetically enclosed in a coating of protective material, said coating being of continuous character as a result of fusion under compression. According to the invention, a compressed tablet hermetically sealed in a coating of protective material is prepared by providing a core containing the desired active ingredients, and then forming by fusion under compression upon the core a continuous coating of protective material. This process may be described as "compression encapsulation." It may be carried out in machines of the type described in U.S. Patent No. 2,700,938. Various other machines currently available for compression-coating may be used for compression encapsulation.

Coating materials which may be used for medicinal tablets should be relatively non-toxic even on chronic administration, preferably white or colorless, stable and solid at normal temperatures, and resistant to air, moisture, light and heat, chemically and pharmaceutically compatible with or inert towards the other ingredients of the tablet, palatable or practically odorless and tasteless and soluble in body fluids in greater or less degree. Such substances may be waxes, resins, polymers or copolymers or plastics such as cellulose derivatives. These may be natural or synthetic, and may be thermoplastic or thermosetting materials.

Among the materials which we have found suitable are polyethylene glycols of high molecular weight, ranging in average molecular weight from about 4,000 to about 20,000 ("Carbowax"), or their modifications such as fatty acid mono- or di-esters or ethers, higher condensates of polyethylene oxide known as "Polyox" resins which range in average molecular weight from about 200,000 to 5,500,000, vinyl polymers such as "Carbopol" (high molecular weight), polyvinyl alcohol, polyvinyl acetate and polyvinyl chloride, polyvinyl pyrrollidone, polyethylene and polystyrene; acrylic resins such as polymethyl methacrylate and polyacrylamides; cellulose derivatives such as cellulose ethers and esters, for example: ethyl and methyl cellulose, carboxymethyl cellulose, hydroxyethyl cellulose, cellulose acetate and cellulose acetate-phthalate; modified starches and copolymers of such materials; and mixtures thereof. Thermosetting materials may also be used, for example: urea-formaldehyde or melamine-formaldehyde resins. When using a thermosetting resin it is advantageous to use it in an incompletely cured state; it is then possible during, or immediately after, the subsequent compression encapsulation step to subject it to moderate heat treatment, thereby curing and hardening the resin and rendering it insoluble to the desired degree.

In carrying out the present invention, the coating material in granular form is first fed into the die of a tablet compressing machine. The core tablet is then placed on top of the coating granules and more coating granules are fed into the die cavity on top of the core tablet. The contents of the die cavity are subjected to compression and the coating granules are caused to fuse. The fused coating flows around the tablet core, forming thereon a continuous coating which hermetically seals the core.

These operations are best carried out under conditions of controlled temperature and humidity.

The successive stages in the process and the products thereof are illustrated in the accompanying drawings, in which.

Figures 1, 2, 3, 4:
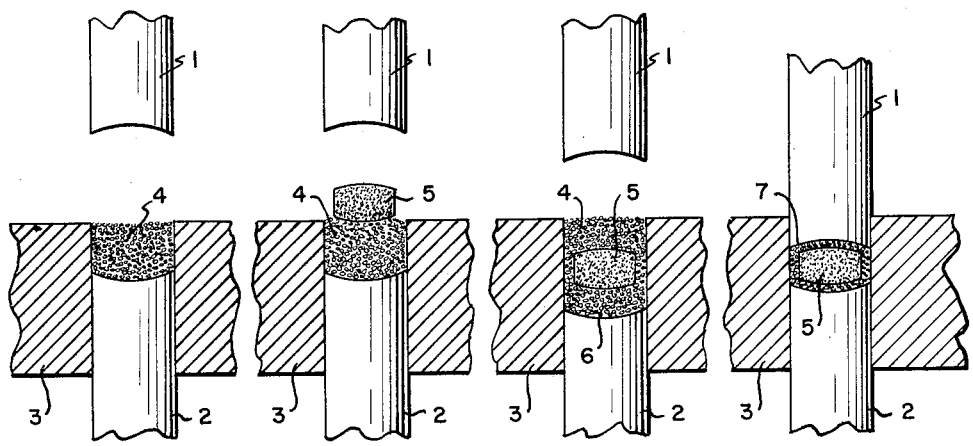
FIGURES 1 to 5 represent vertical mid-sections through the punches and die of a tablet compressing machine at successive stages of the process.
Figures 5, 6, 7:
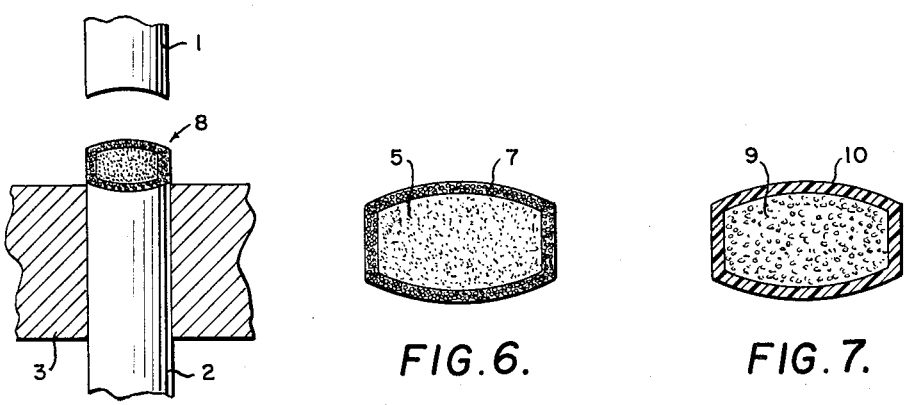
FIGURE 6 is an enlarged vertical cross-sectional view of a finished tablet in accord with my invention.
FIGURE 7 is an enlarged vertical cross-sectional view of a finished tablet in accord with a modified form of my invention.

In the drawings 1 represents the upper and 2 the lower punch in a die 3. FIGURE 1 shows the positions of the punches during the introduction of coating granules 4 called the "bottom fill" for the bottom coating of the tablet. FIGURE 2 shows the placing of the core tablet 5 centered and bedded on the bottom fill. FIGURE 3 shows the recession of the lower punch, the bottom fill and the core tablet into the die and the introduction of coating granules 6 called the "top fill" for the top coating of the tablet. FIGURE 4 shows the positions of the punches during the compression step which causes fusion and flow of the bottom fill and top fill around the tablet core to form a continuous coating 7 which hermetically seals the core 5. FIGURE 5 shows the positions of the punches during the ejection of the coated tablet 8 from the die.

In the embodiment shown in FIGURE 7, the core material is in granular form 9 hermetically enclosed in the plastic material 10.

Figure 8:
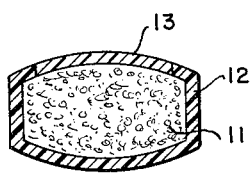
FIGURE 8 is an enlarged vertical cross-sectional view of a finished tablet in accord with a further modified form of my invention.

The embodiment illustrated in FIGURE 8 comprises a compressed core tablet or granular core 11, enclosed in an opaque plastic coating 12, having a window 13 of transparent plastic.

The coating thickness at the sides of the tablet is controlled by the difference between the core tablet diameter and the size of the coating die. The thicknesses of the coating, top and bottom, are independently adjustable and can be controlled more or less as desired by varying the shape of the die, the nature of the coating material and/or the amounts of the bottom fill and the top fill.

Some coating materials suffer from the drawback of tending to stick to the punches or die cavities. In such cases this difficulty may be overcome by the use of lubricants such as metallic stearates, talc, starches, oils and waxes.

The coating material may be colored with suitable colors such as the FD & C colors and/or D & C and/or pigments. The dry plastic coating material should be reduced to a suitable mesh size and be free-flowing. If desired, the tablet can be polished by the usual methods. The coating formed around the core tablets in this manner is a continuous integral film. If excipients or functional fillers are included in the coating material the process causes these to be enmeshed in a matrix which remains as a continuous integral film coating around the tablet core.

The compression step causes the coating material to fuse and flow around the core tablet to form a continuous coating with no bubbles or voids. If desired, this process may be assisted by raising the temperature of the die. When thermosetting materials are used as coatings the extent of curing is controlled to produce a film which has the requisite swelling, solubility or dispersability characteristics.

It is also possible by the process of this invention to combine two incompatible drugs; one is incorporated in a core tablet and the other in the coating material. By repeating the press-coating process layer separation of successive ingredients may be effected for instance for multi-vitamin mineral tablets. Such conotrl in pan-coating is difficult and time-consuming. Tablet cores may be formulated for rapid disintegration and compressed to a lesser degree.

By means of the process of this invention the disintegration time of the tablet may be made independent of the pH of the body fluid environment, and made a function only of time, by controlling the thickness or character of the applied coating material. For example: a methyl cellulose film coating of thickness from about 0.28 to 0.70 mm. will dissolve in the stomach before the gastric contents are discharged into the intestinal tract. However, if the thickness of the coat is increased to 2 mm. then the coating will provide enteric protection because it does not entirely dissolve before the tablet is passed into the intestinal tract.

Additional advantages of this invention are that tablets with sugarless coatings thus produced are of special value to diabetics and others who should restrict the use of sugar. Also when used for prolonged action or time-delay tablets prolonged time diffusion may be obtained rather than a mere delayed disintegration as with prior art types. It is also possible to use an opaque coating material for the bottom and side surfaces of the tablet and apply granules of transparent coating material for the top surface of the tablet so as to create a "windowed" tablet, by feeding the bottom and top coating granules from two hoppers.

When preparing medicinal tablets we have found it possible to use a size of coating granule from about number 14 to number 200 mesh; however, depending upon the specific flow characteristics of the material used, a mesh size of from about 16 to 60 mesh is generally preferable.

We have found that the coating pressure may be between about 1,000 and about 75,000 pounds per square inch. It is generally preferred to use between about 2,000 and 35,00 pounds per square inch.

It is also possible by the use of a tableting machine with suitable hoppers to use a loose granulation or powder as a core and to surround it with a coating granulation, then compress both core and coating into a tablet in one operation.

The following non-limiting examples illustrate various embodiments of the present invention:

EXAMPLE 1
Core Granulation

|  | Gms. |
|---|---|
| "Silene E.F." (calcium silicate) | 100 |
| Acacia | 20 |
| Mix well, and adsorb on to mix vitamin E | 100 |

(Then granulate with water q.s. to achieve a doughy paste. Granulate thru No. 16 screen if required, dry at 120° F. to 0.25% moisture. Pass thru No. 20 mesh screen.)

EXAMPLE 2
Core Tablet

|  | Parts |
|---|---|
| Salicylamide, powd | 40 |
| Acetphenetidin, U.S.P | 70 |
| Caffeine alkaloid, anhydrous U.S.P | 8.5 |
| Pyrilamine maleate, U.S.P | 20 |
| Hesperidin, purified, powd | 9 |
| Sugar, powd. —3 percent corn starch | 7 |

Mix well. Granulate thru No. 8 screen, using a solution of:

|  |  |
|---|---|
| "Methocel" (50 cps. viscosity) | 1 |
| Alcohol, S.D. 3A (95 percent) | 20 |

Dry at 130° F. Pass dried granulation through No. 10 screen. Add and mix well with following granulation:

|  |  |
|---|---|
| Corn starch | 7 |
| Talc, powd | 7 |
| Acid, ascorbic U.S.P | 24 |

Granulate thru No. 14 screen with following solution:

|  |  |
|---|---|
| Gelatin U.S.P | 0.5 |
| Water | 30 |

Dry at 140° F. Pass thru a No. 20 screen. (Compress tablets, using 15/32" deep cup punch. Each tablet weighs 9.7 grains.)

EXAMPLE 3
Polyvinyl Alcohol Coating

One hundred grams of polyvinyl alcohol (Alvanol grade 50–42), was passed through a comminutor with a No. 30 mesh screen. It was then passed through a No. 40 screen to remove the bigger particles, and mixed well. Five grams of titanium dioxide N.F. were added and then mixed well in; then 0.5 gram of magnesium stearate were mixed well.

This coating granulation was fed into a machine of the Manesty DryCota type, and compressed upon a tablet core made with 7/16 inch size deep cup punches, using a ½ inch extra deep cup punch.

The tablets were prepared at a room temperature of 75° F. and relatively humidity of 30%. No sticking to the punches was observed and the coated tablet produced had a closely fitting continuous plastic film-like coating.

EXAMPLE 4
Cellulose Acetate-Phthalate

One thousand grams of cellulose acetate-phthalate were passed through a No. 30 mesh screen. The tablet cores used were compressed with a No. 5 oval punch. These tablet cores and the granular coating material were fed into a Manesty DryCota machine, and the coating compressed on the cores, using a special oval punch No. 6. These operations were carried out at a relative humidity of 30% and at a temperature of 75° F.

The tablets produced had a hard glossy surface; there was no evidence of sticking or capping.

When a pressure of 27,000 p.s.i. was employed in the compression encapsulation step, a film thickness of 1 mm. was produced on the tablet, whereas at 40,000 p.s.i. the thickness was 0.3 mm. The coating had the following characteristics:

|  | 27,000 p.s.i. | 40,000 p.s.i. |
|---|---|---|
| Gloss | None | Semi-lustre. |
| Transparency | do | None. |
| Elasticity | Moderate | High. |
| Fragility | None | None. |
| Permeability | Low (under 1%). | Negligible. |
| Disintegration [1] (intestinal juice) | 22 min | 41 min. |
| Disintegration (gastric juice) | 1 hour undissolved. | 1 hr. min. undissolved. |

[1] Disintegration test according to U.S.P. XVI, using the prescribed apparatus and technique, was used in this and the following examples.

EXAMPLE 5
Methyl Cellulose Coated Tablet

Five hundred grams of "Methocel," (grade 2602 of 50 cps. viscosity) and having a No. 60 mesh size, produced by an intermediate compacting step (slugging) with subsequent regrinding and separation of the 60 mesh fraction, was compressed on tablet cores of the following formula, which had been performed with a No. 5 oval punch. The compression encapsulation was carried out using a special oval punch No. 6 at an ambient temperature of 78° F. and relative humidity of 26%.

|  | Parts |
|---|---|
| Acid, ascorbic U.S.P., powd. No. 200 | 17.7 |

Granulate through No. 14 screen, using a 7% gelatin solution:
Dry at 140° F., and screen thru No. 20 mesh. Add and mix well magnesium stearate

|  |  |
|---|---|
| U.S.P. | 0.12 |

Mix the following:

|  |  |
|---|---|
| Nicotinamide U.S.P., powd | 4 |
| Riboavin U.S.P., powd | 0.45 |
| Calcium pantothenate (dextro.) U.S.P | 1.5 |
| Pyridoxine hydrochloride U.S.P. powd | 0.42 |
| Sugar, milk U.S.P., powd | 4.6 |

(Granulate through No. 14 screen, using a 2% 50 cps. Methocel in alcohol (95 percent) SD3A solution. Dry at 140° F.)

Pass through No. 16 screen and add, mix well:

|  |  |
|---|---|
| Magnesium stearate U.S.P | 0.1 |

Mix the following:

|  |  |
|---|---|
| Vitamin A & D "Crystalets" (500,000 units A and 50,000 D/gram) | 3.8 |
| Thiamine hydrochloride U.S.P. fine crystals | 0.9 |
| Acid, tartaric, N.F., powd | 0.4 |
| Vitamin B12, oral-1000 mcgm./gm. activity | 0.51 |
| Acid, folic U.S.P., powd. (adjust if necessary) | 0.015 |

Now, add and mix well:

|  |  |
|---|---|
| Magnesium stearate U.S.P | 0.01 |

Combine above 4 mixtures and compress, using a No. 3 oval punch.
(Each tablet core=3.4 grains.)

The tablets produced had a continuous surfaces film which was slightly transparent, cream colored and of hard surface texture.

Using a compression encapsulating pressure of 27,000 p.s.i. the film coating had a thickness of 0.7 mm., whereas at 40,000 p.s.i. the film thickness was 0.28 mm. The coatings had the following characteristics:

|  | 27,000 p.s.i. | 40,000 p.s.i. |
| --- | --- | --- |
| Fragility | Moderate | Practically none. |
| Gloss | None | Moderate lustre. |
| Transparency | Semi | Semi. |
| Elasticity | Fair | Fairly good. |
| Permeability [1] | Fair (under 1%). | None detected. |
| Disintegration time (gastric juice) | 20 minutes | 37 minutes. |

[1] Permeability tested by moisture pickup of core determined by weight increase after 24 hours exposure at 94% relative humidity.

EXAMPLE 6

*Sodium Carboxymethylcellulose Coated Tablets*

Eight hundred grams of sodium carboxymethylcellulose between 40 and 60 mesh were used for coating tablet cores of the same formula as in Example No. 5, and compressed with a No. 5 oval punch. The compression encapsulating was carried out using a special No. 6 oval punch.

The coated tablets produced showed no evidence of sticking or lamination; their surface was hard with a film-like appearance. The compression pressure used was 27,000 p.s.i., resulting in a coating film thickness of 0.7 mm., of low gloss and high elasticity. Compression was carried out at a room temperature of 78° F. and relative humidity of 26%. The U.S.P. XVI disintegration time (gastric) was 28 minutes.

EXAMPLE 7

*Carboxymethylcellulose Coated Tablets*

Carboxymethylcellulose (type 70–S), extra fine grind, minimum 60 mesh granules, was used as a coating material on tablet cores as described in Example No. 5. The operations were carried out at a room temperature of 80° F. and relative humidity of 26%. The compression encapsulation was carried out a pressure between 27,000 and 32,000 p.s.i.

The resulting tablets were coated with a hard, continuous, very strong film with high elasticity and of 0.6 mm. thickness.

EXAMPLE 8

*"Polyox" Resin (WSR–301) Coated Tablets*

One thousand grams of "Polyox" resin WSR–301 were screened through a No. 16 mesh screen to remove the larger refractory particles. Nine hundred grams of the screened material (approximately 20 mesh size) were mixed with 200 grams of Dry Ice fragments of a size between one and two inches and allowed to stand one-half hour. The mixture was then passed slowly through a Fitz comminutor four times, with the hammer ends positioned forward and with the continuous addition of 300 grams of Dry Ice, using a No. 20 screen. The comminuted material was then passed through a No. 20 screen and the retained material discarded (21%). From the remaining material (approximately 79%) 6% of the fines (over 60 mesh) were discarded.

This now free-flowing granular coating material was then used for compression encapsulating on 7/16 inch tablet cores, using extra deep cup ½ inch die and punches. These operations were carried out at a relative humidity of 40% and a temperature of 25° C.

The resulting tablets showed no sticking to the die or the punches. The characteristics of the coated tablet were found to vary according to the pressure used in the compression encapsulating step, and were considered excellent above 36,000 p.s.i.

|  | 10,000 p.s.i. | 27,000 p.s.i. | 45,000 p.s.i. | Over 60,000 p.s.i. |
| --- | --- | --- | --- | --- |
| Film thickness | 1 mm | 0.25 mm | 0.10 mm | Extremely thin. |
| Fragility of coat | High (poor) | Low (good) | None | None. |
| Gloss | Low (lustre) | Moderate | High (true gloss) | High. |
| Transparency | Low | Moderate | Moderate | Moderate. |
| Elasticity | Low | Fair | Moderate | High. |
| Permeability | Poor (over 2%) | Fair (about 1%) | Not detected | None detected. |
| Disintegration (gastric juice) | 10 min | 18 min | 20 min | 35 min. |

EXAMPLE 9

*Polyacrylamide Coated Tablets*

One thousand grams of polyacrylamide No. 100 were sieved to remove all particles greater than No. 40 mesh. Of the fines constituting 41%, 11% were removed and 800 grams of the remaining material were mixed well with 8 grams of cetyl alcohol N.F. as a plasticizer. Tablet cores of 7/16 inch were compression-encapsulated with the above mixture in ½ inch deep cup die punches.

These operations were carried out at a relative humidity of 30% and room temperature of 76° F.

The coated tablets produced showed no evidence of sticking or capping. The coating film characteristics at various compression pressures were considered very good and are tabulated below:

|  | 18,000 p.s.i. | 36,000 p.s.i. | 45,000 p.s.i. | Over 68,000 p.s.i. |
| --- | --- | --- | --- | --- |
| Film thickness | 1.2 mm | 0.4 mm | 0.075 mm | Extremely thin. |
| Fragility | Brittle | Moderate | Low | None. |
| Gloss | Poor | Fair | Good | High. |
| Transparency | Low | Moderate | Moderate | High. |
| Elasticity | Poor | Fair | Moderate | Good. |
| Permeability | High | Fair (1%) | None detected. | None detected. |
| Disintegration: |  |  |  |  |
| Gastric juice | 45 min | 18 min | 21 min | 25 min. |
| Intestinal | 15 min | 8 min | 5 min | 12 min. |

Three-eighths inch tablet cores of this material were also coated in 5/8 inch deep cup die punches and the results were similar.

EXAMPLE 10

*"Carbowax" Coated Tablets*

One hundred and fifty grams of "Carbowax 6000," micronized, were mixed thoroughly with 136 grams of powdered Italian talc and 15 grams of titanium dioxide. The mixture was passed through a No. 30 mesh screen and then granulated through a No. 14 mesh screen with aqueous alcohol (alcohol 75%, water 25%). The granulate was dried in an oven at 120° F. and then passed through a No. 16 mesh screen. To the product, 1% of magnesium stearate (Plymouth) (3 grams), was added.

Tablet cores of the formula in Example No. 2, were compressed with an oval punch No. 5 and were compression-encapsulated with the above coating material in a special oval No. 6 punch. These operations were carried out at a room temperature of 72° F. and relative humidity of 27%. Compression pressure was between 22,000 and 27,000 p.s.i.

The coated tablets produced showed no evidence of capping, sticking or of lamination. The film thickness of the coating was 0.5 mm. and the coating possessed the following characteristics:

| | |
|---|---|
| Fragility | None. |
| Gloss | High (excellent). |
| Transparency | Moderate. |
| Elasticity | Low. |
| Permeability | Low. |
| Disintegration (gastric juice) | 4 min. |

EXAMPLE 11

The procedure described in Example 10 above was followed, but with the addition of a small quantity of tartrazine yellow No. 5, FD & C, to the aqueous alcohol granulating solution.

The compression encapsulated tablets produced were evenly colored and possessed a glossy surface texture. The coating was found to be uniform and continuous, had a thickness of 0.55 mm. and otherwise possessed the same characteristics as the samples made in Example No. 10, although disintegration time was slightly longer, 4.5 min. (gastric).

EXAMPLE 12

The procedure described in Example 10 was followed except that half the quantity of "Carbowax 6000" was used (75 grams), together with an equal quantity of "Carbowax compound 20-M" (75 grams). The coated tablets produced at various compression pressures showed the characteristics tabulated below:

| | 18,000 p.s.i. | 36,000 p.s.i. | 45,000 p.s.i. | 63,000 p.s.i. |
|---|---|---|---|---|
| Film thickness | 1.3 mm | 0.700 mm | 0.100 mm | Extremely thin. |
| Fragility | Moderate | None | None | None. |
| Gloss | Fair | High | High | High. |
| Transparency | None | None | Moderate | None noticeable. |
| Elasticity | Fair | Fair | Fair | High. |
| Permeability | High (over 5%) | Fair (1%) | None | None. |
| Disintegration (gastric juice) | 25 min | 15 min | 10 min | 11 min. |

EXAMPLE 13

Two hundred grams of "Carbopol 940" were mixed well with 100 grams of Italian talc and 10 grams of titanium dioxide. The mixture was granulated with ether, using a 20 mesh screen, and the product was placed in an oven at 40° C. to evaporate the ether completely. One gram of magnesium stearate was added and the mixture was used to compression encapsulate 7/16 inch tablet cores, using ½ inch special deep cup punches.

The coated tablets produced exhibited a continuous glossy film-like coating, and were found to be satisfactory with compression pressures from 9,050 pounds to 45,000 pounds. The data obtained showed that the degree of core shrinkage was less than 4%. Cores used were made of soft aspirin compound (5 grain, 7/16 inch) prepared as follows.

5 gr. aspirin tablets, USP:

| | Parts |
|---|---|
| Actyl salicylic acid, USP | 250.00 |
| Corn starch | 18.75 |
| Potato starch | 6.25 |
| | 275.00 |

Mix thoroughly and compress only in relative humidity of less than 25% to a hardness of 3 to 4 kilograms as measured on the Monsanto Hardness Tester that tablets will disintegrate in one minute.

The test results are tabulated below:

Coating: Carbopol 940 (Goodrich).
Core: Aspirin 5 gr. 7/16 inch.

| Test No. | Core weight, mg. | Coating, weight/ thickness | Core thickness, before/ after, in. | Core shrinkage, percent | Est. coating pressure, p.s.i. | Coating strippability | U.S.P. disintegration time | | Permeability | |
|---|---|---|---|---|---|---|---|---|---|---|
| | | | | | | | Gastric | Enteric, min. | 24 hr.-94° R.H. | 48 hr.-64° R.H. |
| A | 350 | 60 mg./.012" (.3 mm.) | 174/174 | None | 13,500 | Coat strips leaving core intact. | 55 min | 5 | Under 1% wt. inc. | None. |
| B | 360 | 55 mg./.008" (.2 mm.) | 178/178 | None | 13,500 | | 25 min | 5 | App. 2% wt. inc. | Do. |
| C | 360 | 90 mg./.02" (.5 mm.) | 175/170 | 2.9 | 13,500 | | 2 hrs | 10 | Not detected | Not detected. |

EXAMPLE 14

The procedure described in Example 13 was followed, using "Carbopol 934" (Goodrich Chemical) in place of "Carbopol 940."

The compressed coated tablets produced were satisfactory up through compression pressures of 31,680 p.s.i., and similar in all respects to samples made in Example 13.

EXAMPLE 15

Coating: Polyvinyl alcohol, processed as in Example 3.
Cores: Aspirin 5 grain 7/16 inch 5 kg. Strong Cobb hardness.
Punch: ½ inch extra deep cup.

The test results were as follows:

| Test No. | Core weight, mg. | Coat each side, weight/ thickness | Core thickness, before/ after, in. | Core shrinkage | Est. coating pressure,[1] p.s.i. | Coat strips and core intact | U.S.P. disintegration time | | Permeability | |
|---|---|---|---|---|---|---|---|---|---|---|
| | | | | | | | Gastric | Enteric, min. | 24 hr.-94° R.H. | 48 hr.-64° R.H. |
| A | 375 | 200 mg./.059" (1.5 mm.) | .177/.177 | None | 27,000 | Yes | No | 50 | None | None. |
| B | 380 | 150 mg./.045" | .180/.180 | do. | 22,500 | Yes | No | 45 | do | Do. |
| C | 385 | 120 mg./.035" | .182/.181+ | Nil | 18,000 | Yes | No | 30 | Nil | Do. |
| D | 360 | 100 mg./.030" | .172/.172 | None | 18,000 | Yes | 1 hour | 20 | 1% (core)[1] | Do. |

[1] App.

EXAMPLE 16

Coating: Cellulose Acetate-phthalate, processed as in Example 4.
Cores: Thiourea 8 gr. 7/16 inch med. hard 7 kg. (Strong Cobb).
Punch: ½ inch extra deep cup.

10.5 kg. hardness (Strong Cobb). Samples A, B, C, D, E.
(b) Thiourea 7/16 inch 8 gr. med. hard 8 kg. (S.C.). Samples F, G.
(c) Aspirin compound A.P.C. 7/16 inch 5 gr. soft 5 kg. Samples H, I, J.

The test results were as follows:

| Sample No. | Core weight, mg. | Coat each side, weight/thickness | Core thickness, before/after, in. | Core shrinkage | Est. coating pressure, p.s.i. | Coat strips and core intact | U.S.P. disintegration time | | Permeability | |
|---|---|---|---|---|---|---|---|---|---|---|
| | | | | | | | Gastric, min. | Enteric, min. | 24 hr.–94° R.H. | 48 hr.–64° R.H. |
| A | 510 | 150 mg./.045" (.11 mm.) (30x) | .188/.188 | None | ¹ 27,000 | Yes | 17 | 15 | Test not suitable | Soft coat. |
| B | 500 | 150 mg./.040" (30x) | .186/.185+ | Nil | ¹ 36,000 | Yes | 17 | 16 | do | Do. |
| C | 500 | 150 mg./.043" (30x) | .187/.187 | None | 18,000 | | | | | |
| D | 510 | 200 mg./.057" (40x) | .186/.186 | do | 13,500 | Yes | 22 | 20 | Test not suitable | Soft OK. |
| E | 520 | 180 mg./.055" (40x) | .189/.188+ | Nil | 13,500 | Yes | 20 | 19 | do | Do. |
| F | 525 | 150 mg./.038" (30x) | .170/.170 | None | 13,500 | Yes | 13 | 12 | do | Soft. |
| G | 540 | 150 mg./.039" (30x) | .172/.172 | do | 18,000 | Yes | 15 | 13 | do | Do. |
| H | 375 | 200 mg./.064" (40x) | .177/.177 | do | 9,000 | Yes | 20 | 18 | do | Soft coat. |
| I | 385 | 200 mg./.061" (40x) | .181/.181 | do | 13,500 | Yes | 24 | 23 | do | Soft OK. |
| J | 370 | 200 mg./.064" (60x) | .173/.173 | do | 13,500 | Yes | 25 | 24 | do | OK. |

¹ App.

The test results were as follows:

| Test No. | Core weight, mg. | Coat each side, weight/thickness | Core thickness, before/after, in. | Core shrinkage | Est. coating pressure, p.s.i. | Coat strips and core intact | U.S.P. disintegration Time | | Permeability | |
|---|---|---|---|---|---|---|---|---|---|---|
| | | | | | | | Gastric | Enteric, min. | 24 hr.–94° R.H. | 48 hr.–64° R.H. |
| A | 525 | 150 mg./.043" | .174/.174 | None | 27,000 | Yes | Over 1 hr. | 40 | None | None. |
| B | 540 | 120 mg./.04" (1 mm.) | .176/.175+ | Nil | ¹ 27,000 | Yes | Over 1 hr. | 22 | None | None. |
| C | 530 | 100 mg./.028" | .172/.171+ | Nil | 22,500 | Yes | 50 min. | 15 | Under 1% | Traces. |

¹ Mod.

EXAMPLE 17

Coating: Modified starch. Preparation, wet granulate with 1% FDC Red No. 1 using 95% alcohol through (a) 30 mesh; (b) 60 mesh; (c) 200 mesh.
Cores: Ferrous sulfate compound 7/16 inch 8 grain, med. hardness (7 kg.).

| Test No. | Core weight, mg. | Coat each side, weight/thickness | Core thickness, before/after, in. | Core shrinkage | Est. Coating pressure,¹ p.s.i. | Coat strippability and core intact | U.S.P. disintegration time | | Permeability | |
|---|---|---|---|---|---|---|---|---|---|---|
| | | | | | | | Gastric, min. | Enteric, min. | 24 hr.–94° R.H. | 48 hr.–64° R.H. |
| A | 520 | 250 mg./.08" (2 mm.) | .170/.169+ | Nil | 22,000 | Yes | 40 | 30 | None | None. |
| B | 540 | 200 mg./.07" | .170/.169+ | Nil | 31,700 | Yes | 30 | 25 | do | Do. |
| C | 550 | 150 mg./.06" | .176/.176 | No | 31,700 | Yes | 25 | 15 | Under 1% | None found. |

¹ Abt.

The test results were as follows:

| Test No. | Core weight, mg. | Coat each side, weight/thickness | Core thickness before/after, in. | Core shrinkage | Est. coating pressure, p.s.i. | Coat strippability and core intact | U.S.P. disintegration time | | Permeability | |
|---|---|---|---|---|---|---|---|---|---|---|
| | | | | | | | Gastric | Enteric | 24 hr.–94° R.H. | 48 hr.–64° R.H. |
| A | 530 | 200 mg./.067" (.17 mm.) (200x) | .169/.168+ | Nil | 18,000 | Yes | 110 min. | 40 min. | None | None. |
| B | 550 | 200 mg./.065" (60x) | .171/.171 | None | 27,000 | Yes | 90 min. | 30 min. | do | Do. |
| C | 570 | 150 mg./.049" (60x) | .177/.177 | do | 36,000 | Yes | 1 hour | 20 min. | do | Do. |
| D | 530 | 150 mg./.05" (60x) | .171/.171 | do | 31,700 | Yes | 45 min. | 18 min. | Under 1% | Do. |

EXAMPLE 18

Coating: "Carbowax 6000" micronized. Preparation as in Example No. 10.
Punches: ½ inch special deep.
Cores:
(a) Ammonium chloride-bromide 7/16 inch 7½ grns.

EXAMPLE 19

Coating: Carboxymethyl-cellulose (type 70S). Preparation, slug then grind to 40 mesh.
Core: "Ferrous sulfate compound 7/16 inch" 8 grain medium hardness (7 kg.).
Test results were as follows:

EXAMPLE 20

Coating:
Polyacrylamide grade 100 resin, plasticized as follows:
In test A polyoxyethylene stearate and cetyl alcohol. In tests B, C and D polyoxyethylene stearate alone.

Cores: Iron sulfate compound. Aver. size 8 gr. 7/16 inch medium hardness.

phthalate while tumbling in a coating pan and dust with lubricant as needed.

| Test No. | Core weight, mg. | Coat each side, weight/thickness | Core thickness, before/after, in. | Core shrinkage | Est. coating pressure,[1] p.s.i. | Coat strippability and core intact | U.S.P. disintegration time | | Permeability | |
|---|---|---|---|---|---|---|---|---|---|---|
| | | | | | | | Gastric | Enteric | 24 hr.- 94° R.H. | 48 hr.- 64° R.H. |
| A | 520 | 200 mg./.074″ (1.8 mm.) | .170/.170 | None | 18,000 | Yes | No over 2 hrs. | Yes 15 min. | Not detected | Not detected. |
| B | 520 | 200 mg./.070″ | .171—/.170+ | do | 18,000 | Yes | No over 2 hrs. | Yes 20 min. | do | Do. |
| C | 555 | 150 mg./.054″ | .176+/.177 | do | 18,000 | Yes | Yes 1 hour | No | do | Do. |
| D | 545 | 100 mg./.030″ | .171—/.170+ | do | 18,000 | Yes | Yes 25 min. | No | do | Do. |

[1] App.

EXAMPLE 21

*Compression Encapsulation "Window" Coatings*

Coating: Opaque portion, "Carbowax 6000" micronized-colored with FDC Red No. 2 prepared as in Example No. 10 or sodium carboxymethyl cellulose prepared as in Example No. 6. Transparent or translucent window: Polyvinyl alcohol prepared as in Example No. 3 or uncolored "Carbowax 6000" as in Example No. 10.
Core: Ammonium chloride 7/16 inch, 8 grain.
Punch: ½ inch extra deep cup.

The table cores were compression encapsulated on a "Manesty DryCota" machine by feeding a 200 mg. bottom fill of opaque colored Carbowax or carboxymethyl cellulose, superimposing the core and then feeding the 120 mg. top fill of uncolored polyvinyl alcohol or "Carbowax 6000," followed by compression at 27,000 p.s.i.

The product was a uniformly colored high gloss coat on the tablets which was fused to and framed a transparent colorless uniformly shaped window across one entire face of each tablet. The coat was uniform in thickness and hermetically sealed the core but could be stripped from the core without damaging the latter.

EXAMPLE 22

*Compression Encapsulation of Powders*

Coating material: "Carbowax 6000" prepared as in Example No. 10.
Punch: ½ inch extra deep cup and regular types.
Core: consists of free flowing powders of which the following is an example: Vitamin A Crystallets, mixed gently with 1% magnesium stearate.

Procedure: 120 mg. of "Carbowax" coating granulation was bottom filled into the die of a Manesty DryCota machine. Next 25 mg. of the lubricated Vitamin A Crystallets are fed onto the center of the bottom fill. 120 mg. of "Carbowax" are now top filled and a pressure of approximately 36,000 to 45,000 p.s.i. is applied (high).

The product was a highly glossy, smooth, uniform, hard, very durable and resistant tablet bearing the crystallets enmeshed in the center as a "core."

This example was successfully repeated with carboxymethyl cellulose, polyacrylamide, polyvinyl alcohol, modified starch, Carbopol and other plastics.

EXAMPLE 23

*Compression Encapsulation of Granules*

The process of Example 22 was used with a phenobarbital granulation and "Carbowax 6000" micronized as coating material prepared in Example No. 10. The requisite dose of prepared granulation was thereby enmeshed within the center of the tablets to form a "core."

The phenobarbital granulation is made as follows:
Phenobarbital, 50 grams. Prepare a dough with soya flour and water; knead; mix in the phenobarbital to yield a concentration of ¼ grain medicament per 50 mg. of dry granulation. Granulate through a No. 30 mesh and dry. Spray the granulation with shellac or cellulose acetate-

EXAMPLE 24

*Compression Encapsulation of Coated Pellets*

The process of Example 23 was used except that coated pellets with varying disintegration times were used as the core material.

The coated pellets are made as follows:

```
                                        Per tablet, mg.
d-Amphetamine sulfate _____ 10
Stearic acid _____ 15
                                                 ——
                                                 25
```

Melt the stearic acid and disperse the d-amphetamine sulfate therein. While pasty force through a No. 30 screen. Roll into uniform free flowing spheres in a pan.

25 mg. were fed into the die between two 120 mg. charges of coating granulation.

I claim:

A method of making an oral dosage tablet form which comprises: compressing a first finely-divided medicinal ingredient-containing portion to form a compressed tablet core having smaller dimensions than the desired finished tablet form; positioning the preformed compressed tablet core in contact with a coating material containing a second finely-divided medicinal ingredient portion; compressing said second portion, at a pressure between about 1000 and about 75,000 pounds per square inch, about said compressed tablet core until it fuses to form a continuous integral film coating which hermetically seals the core.

References Cited in the file of this patent

UNITED STATES PATENTS

| | | |
|---|---|---|
| 1,087,843 | Smith | Feb. 17, 1914 |
| 1,289,873 | Murakami | Dec. 31, 1918 |
| 1,502,006 | Alvord | July 22, 1924 |
| 1,593,907 | Madan | July 27, 1926 |
| 2,155,444 | Pittenger et al. | Apr. 25, 1939 |
| 2,155,445 | Pittenger et al. | Apr. 25, 1939 |
| 2,219,578 | Pittenger et al. | Oct. 29, 1940 |
| 2,540,253 | Gakenheimer | Feb. 6, 1951 |
| 2,656,298 | Loewe | Oct. 20, 1953 |
| 2,685,517 | Dunmire | Aug. 3, 1954 |
| 2,700,938 | Wolff et al. | Feb. 1, 1955 |
| 2,757,124 | Wolff | July 31, 1956 |
| 2,784,100 | Endicott et al. | Mar. 5, 1957 |
| 2,798,838 | Robinson et al. | July 9, 1957 |
| 2,809,917 | Hermelin | Oct. 15, 1957 |
| 2,849,965 | Stott | Sept. 2, 1958 |
| 2,857,313 | Cooper et al. | Oct. 21, 1958 |
| 2,879,724 | Wyatt et al. | Mar. 31, 1959 |
| 2,887,436 | Klioze et al. | May 19, 1959 |
| 2,887,438 | Cooper et al. | May 19, 1959 |
| 2,888,382 | Pleyte et al. | May 26, 1959 |
| 2,953,497 | Press | Sept. 20, 1960 |
| 2,957,804 | Shuyler | Oct. 25, 1960 |
| 2,987,445 | Levesque | June 6, 1961 |
| 2,991,226 | Millar et al. | July 4, 1961 |

(Other references on following page)

| | | |
|---|---|---|
| 2,996,431 | Barry | Aug. 15, 1961 |
| 3,019,169 | Klumpp et al. | Jan. 30, 1962 |
| 3,039,933 | Goldman | June 19, 1962 |
| 3,048,526 | Boswell | Aug. 7, 1962 |

OTHER REFERENCES

Mitchell: "Coating Tablets by Compression," Mfg. Chem. 26(3) March 1955, pp. 107–111.

Robinson (II): "Coating Tablets by Compression," in Mfg. Chem., 26(4), April 1955, pp. 164–5.

The Pharmaceutical J. (Br.) I, "The Coating of Tablets by Compression," vol. 174, May 7, 1955, pp. 362–3.

Miccicche: "Preparation of Orally Administered Medicaments with Predictable Retarded Effect," (in Italian) in Bolletino Chimico Farmaceutico (Milan), 99, pp. 485–493, 1955.

Tsevdos: "Press-Coated and Multi-Layered Tablets," Drug and Cosmetic Industry, 78(1), pp. 38–40, 113–4, January 1956.

Cooper et al. (II): "Tablet Coating Wet and Dry," Drug and Cosmetic Industry 79(1), pp. 38–9, 108, 118, 120–1, 124, July 1956.

Strickland et al.: J. A. Ph. A., sci. ed., vol. 45, No. 7, July 1956, pp. 482–486.

Cooper et al. (III): "Tablet Coating Wet and Dry," Drug and Cosmetic Industry, 79(2), pp. 188, 277–280, August 1956.

Windheuser et al.: J. A. Ph. A., sci. ed., vol. 95, No. 8, August 1956, pp. 542–545.

Chapman et. al.: "Physiological Availability of Drugs in Tablets," Canad. Med. Assn. J., vol. 76, pp. 102–106, January 15, 1957.

Dragstedt: "Oral Medication with Preparations for Prolonged Action," J.A.M.A., vol. 168, No. 12, pp. 1652–1655, November 22, 1958.

The Pharm. J.: vol. 181, No. 4960, pp 398–9, November 22, 1958.

Lazarus et al.: "Oral Prolonged Action Medicaments: Their Pharmaceutical Control and Therapeutic Aspects," J. of Pharm. & Pharmacol., vol. 11, No. 5, pp. 257–290 (pp. 266–271, 277–279, and 285–288 are especially pertinent to in vitro tablet availability of drugs), May 1959.

Campbell et al.: "Oral Prolonged Action Medication," Practitioner, vol. 183, pp. 758–765, December 1959.